US008174562B2

(12) United States Patent
Hartman

(10) Patent No.: US 8,174,562 B2
(45) Date of Patent: May 8, 2012

(54) STEREO CAMERA HAVING 360 DEGREE FIELD OF VIEW

(75) Inventor: Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1209 days.

(21) Appl. No.: 11/938,068

(22) Filed: Nov. 9, 2007

(65) Prior Publication Data

US 2009/0122133 A1 May 14, 2009

(51) Int. Cl.
- H04N 13/00 (2006.01)
- H04N 5/14 (2006.01)
- H04N 7/00 (2011.01)
- G06K 9/00 (2006.01)

(52) U.S. Cl. ............... 348/42; 348/26; 348/36; 382/154

(58) Field of Classification Search ..................... 348/42
See application file for complete search history.

(56) References Cited

U.S. PATENT DOCUMENTS

| | | | |
|---|---|---|---|
| 4,937,751 A | 6/1990 | Nimura et al. | |
| 5,661,650 A | 8/1997 | Sekine et al. | |
| 5,680,306 A | 10/1997 | Shin et al. | |
| 5,680,313 A | 10/1997 | Whittaker et al. | |
| 5,684,696 A | 11/1997 | Rao et al. | |
| 5,724,123 A | 3/1998 | Tanaka | |
| 5,838,562 A | 11/1998 | Gudat et al. | |
| 5,956,250 A | 9/1999 | Gudat et al. | |
| 6,445,983 B1 | 9/2002 | Dickson et al. | |
| 6,502,033 B1 | 12/2002 | Phuyal | |
| 6,853,906 B1 | 2/2005 | Michi et al. | |
| 7,211,980 B1 | 5/2007 | Bruemmer et al. | |
| 7,552,008 B2 | 6/2009 | Newstrom et al. | |
| 2002/0060784 A1 | 5/2002 | Pack | |
| 2006/0190124 A1 | 8/2006 | Makela | |
| 2006/0197938 A1 | 9/2006 | Halmos et al. | |
| 2006/0268103 A1* | 11/2006 | Kweon et al. | 348/36 |
| 2007/0097206 A1* | 5/2007 | Houvener et al. | 348/26 |
| 2007/0219720 A1 | 9/2007 | Trepagnier et al. | |
| 2008/0039991 A1 | 2/2008 | May et al. | |
| 2008/0085686 A1 | 4/2008 | Kalik | |
| 2008/0144924 A1* | 6/2008 | Hoffmann | 382/154 |

OTHER PUBLICATIONS

Joerger et al., "Range-Domain Integration of GPS and Laser-scanner Measurements for Outdoor Navigation", "ION GNSS 19th International Technical Meeting of the Satellite Division", Sep. 2006, pp. 1115-1123, Published in: Fort Worth, TX.
Advanced Scientific Concepts Inc., "Portable 3D Camera", 2006.
Stettner, Roger et al., "Three Dimensional Flash Ladar Focal Planes and Time Dependent Imaging", Aug. 29, 2006, pp. 1-5, Publisher: Advanced Scientific Concepts, Inc., Published in: Santa Barbara, California.
Jang et al., "Single Camera Catadioptric Stereo System", Sep. 22, 2005, Publisher: Department of Electrical Engineering & Computer Science, Korean Advanced Institute of Science and Technology.

* cited by examiner

*Primary Examiner* — Wing Chan
*Assistant Examiner* — David X Yi
(74) *Attorney, Agent, or Firm* — Fogg & Powers LLC

(57) ABSTRACT

A stereo camera comprises at least one image sensor; a first surface configured to direct a first view of an area to the at least one image sensor, the first view comprising an approximately 360 degree view of the area; and a second surface configured to direct a second view of the area to the at least one image sensor, the second view comprising an approximately 360 degree view of the area; wherein the at least one image sensor is configured to capture the first and second views in at least one image.

10 Claims, 10 Drawing Sheets

STEREO CAMERA HAVING 360 DEGREE FIELD OF VIEW

RELATED APPLICATIONS

This application is related to the following commonly assigned co-pending applications, each of which is hereby incorporated herein by reference:

U.S. patent application Ser. No. 11/678,313 filed on Feb. 23, 2007 and entitled "CORRELATION POSITION DETERMINATION" (the '313 Application).

U.S. patent application Ser. No. 11/837,868 filed on Aug. 13, 2007 and entitled "RANGE MEASUREMENT DEVICE" (the '868 Application).

BACKGROUND

Many navigation applications provide precise locating and tracking of objects. For example, unmanned vehicles, such as an unmanned ground vehicle (UGV), require accurate position information in order to properly navigate an area. Most of these navigation applications employ one or more global positioning system (GPS) sensors to achieve a necessary level of precision.

The use of GPS, however, has some limitations. For example, the GPS signals may not be available in a desired location where satellite communication is blocked. In addition, the GPS sensors do not obtain any position information for local features of the area (for example, any additional surrounding objects or landmarks within the area) relative to the location of the vehicle.

For the reasons stated above and for other reasons stated below which will become apparent to those skilled in the art upon reading and understanding the present specification, there is a need in the art for a system and method of determining a location of a vehicle and surrounding objects as the vehicle traverses through an area using alternative measurement systems.

SUMMARY

In one embodiment, a stereo camera is provided. The stereo camera comprises at least one image sensor; a first surface configured to direct a first view of an area to the at least one image sensor, the first view comprising an approximately 360 degree view of the area; and a second surface configured to direct a second view of the area to the at least one image sensor, the second view comprising an approximately 360 degree view of the area; wherein the at least one image sensor is configured to capture the first and second views in at least one image.

DRAWINGS

The present invention can be more easily understood and further advantages and uses thereof more readily apparent, when considered in view of the detailed description and the following figures in which.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention enable tracking of objects in a 360 degree horizontal field of view with a stereo camera having as few as a single image sensor. Hence, the period of time that an object is in view is increased since the objects do not move out of view when a host unit transporting the stereo camera turns. Similarly, in comparison to typical stereo cameras, which do not have a 360 degree horizontal field of view, the number of objects and the geometry of the objects used to determine the location of the host unit is also improved in embodiments of the present invention. The increase in number of objects is due to the larger field of view along the horizon.

Figure 1:
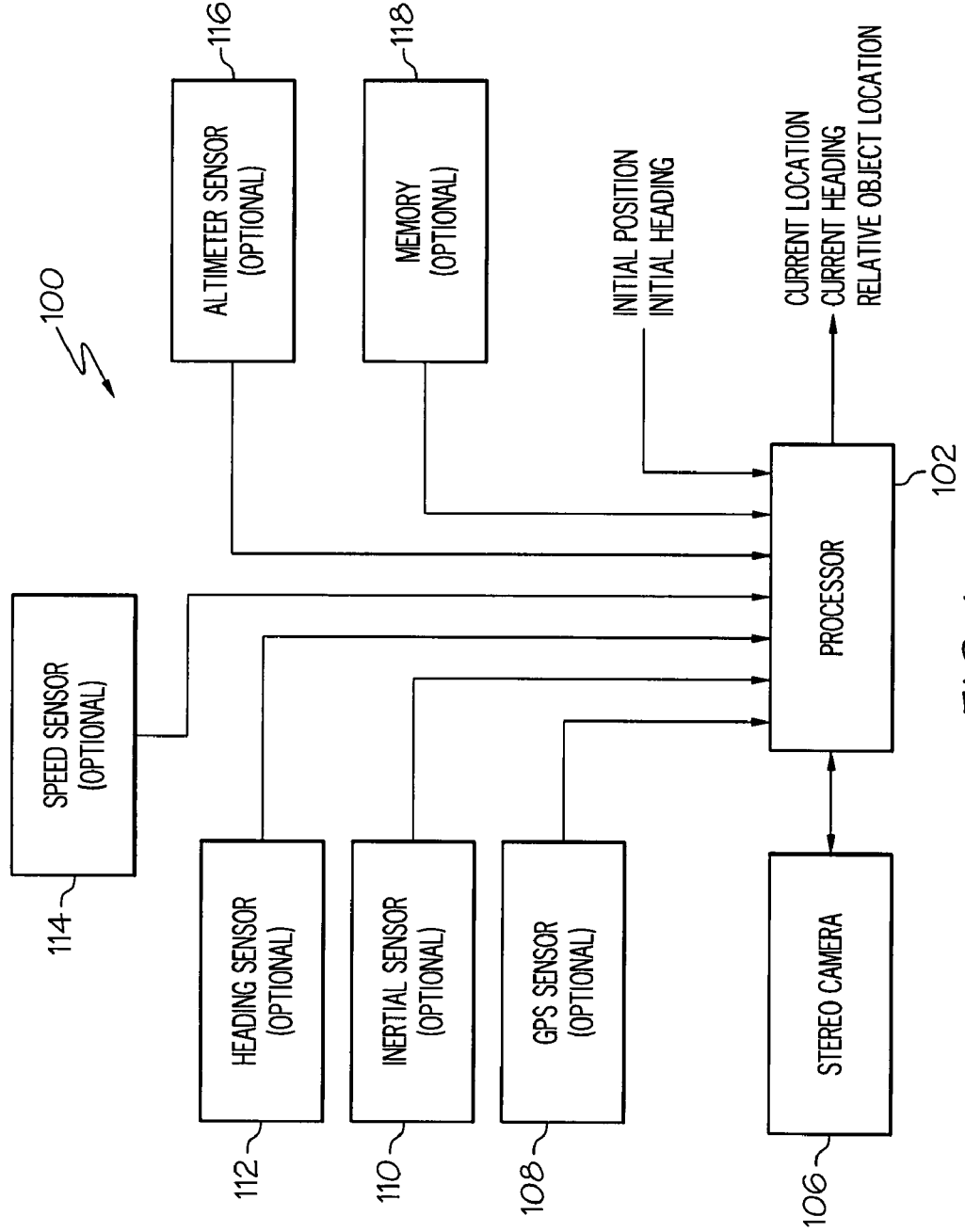
FIG. 1 is a block diagram of a navigation system according to one embodiment of the present invention.

FIG. 1 is a block diagram of a navigation system 100. As illustrated, the navigation system 100 includes a processor 102 that is in communication with a stereo camera 106 having an approximately 360 degree horizontal field of view. In some embodiments, the system 100 includes at least one additional sensor such as a GPS sensor 108, an inertial sensor 110, a heading sensor 112, a speed sensor 114, and an altimeter sensor 116. Navigation system 100 can be used on a host vehicle to aid the host vehicle in traversing an area such as area 200 shown in FIG. 2. Exemplary host vehicles include, but are not limited to, unmanned ground vehicles (UGV) and unmanned aerial vehicles (UAV).

The stereo camera 106 captures two images at approximately the same moment in time. The image data for the two captured images is sent to processor 102. Processor 102 uses the image data to determine range data, including distances and angles, of objects near the stereo camera 106. As indicated above, a stereo camera 106 having up to a 360 degree horizontal field of view is used. The 360 degree horizontal field of view enables detection of objects located in any horizontal direction from the stereo camera 106. Exemplary stereo cameras having an approximately 360 degree horizontal field of view are discussed below with regard to FIGS. 3-6. As the host vehicle passes through an area, the image data from stereo camera 106 is used to track individual ranges between the objects (for example, relative distance data) as well as Earth-referenced angles (for example, absolute distance data) to the objects. Both the relative and absolute distance data are processed in the processor 102.

In the embodiment that includes the inertial sensor 110, additional information is provided to the processor 102 to estimate the location of the host vehicle. Generally, the inertial sensor 110 estimates a present position based on a prior knowledge of time, initial position, initial velocity, initial orientation without the aid of external information. As illustrated in FIG. 1, an initial position input and an initial heading input is provided. The information generated by the inertial sensor 110 (in this embodiment) is provided to the processor 102. The processor 102 uses the inertial sensor 110 data, in combination with the distance and angle data, from the stereo camera 106 to determine the current location of the host vehicle. The current location and current heading is output as illustrated in FIG. 1. The output of the current heading and current location is used to position the system 100 with both absolute and relative navigation coordinates. In other embodiments, one or more of GPS sensor 108, heading sensor 112, speed sensor 114, and altimeter sensor 116 provide data to processor 102 for use in determining absolute and relative navigation coordinates.

Figure 2:
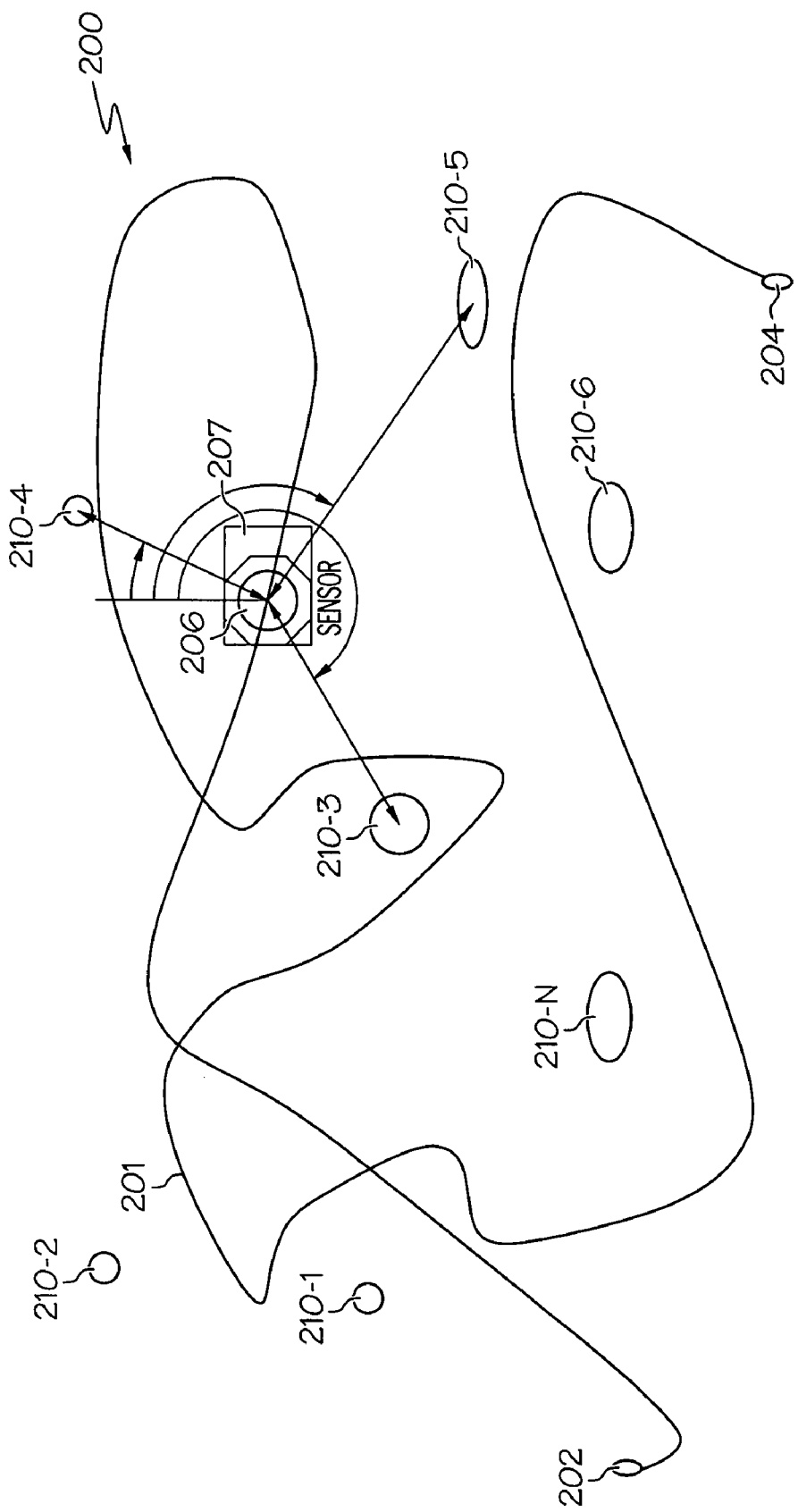
FIG. 2 is a traverse diagram illustrating a host vehicle passing through an area to be traversed.

FIG. 2 is a traverse diagram 200 illustrating a host vehicle 207 (for example, a UGV) passing through an area 200 to be traversed. As illustrated, the area 200 to be traversed includes objects 210-1 through 210-N. In one implementation, the objects 210-1 through 210-N are mapped (for example, previously located) according to a correlation position determination method as disclosed in the '313 Application. The location of mapped objects is stored in a database, such as memory 118, and accessed by a processor, such as processor 102, while the host vehicle 207 navigates area 200. In alternate implementations, locations of the objects 210-1 through 210-N are not previously known and may change. For example, one or more of objects 210-1 through 210-N can be mobile objects, such as vehicles, pedestrians, etc. The host vehicle 207 takes a path 201 that starts at a first point 202 and ends at a second point 204. The host vehicle 207 includes a stereo camera 206 similar to the stereo camera 106 of FIG. 1. The stereo camera 206 captures images comprising an approximately 360 degree horizontal view of area 200 which are used to determine the relative location of the host vehicle 207 and/or objects 210-1 through 210-N, as further described below with respect to FIGS. 3-6.

Figure 3:
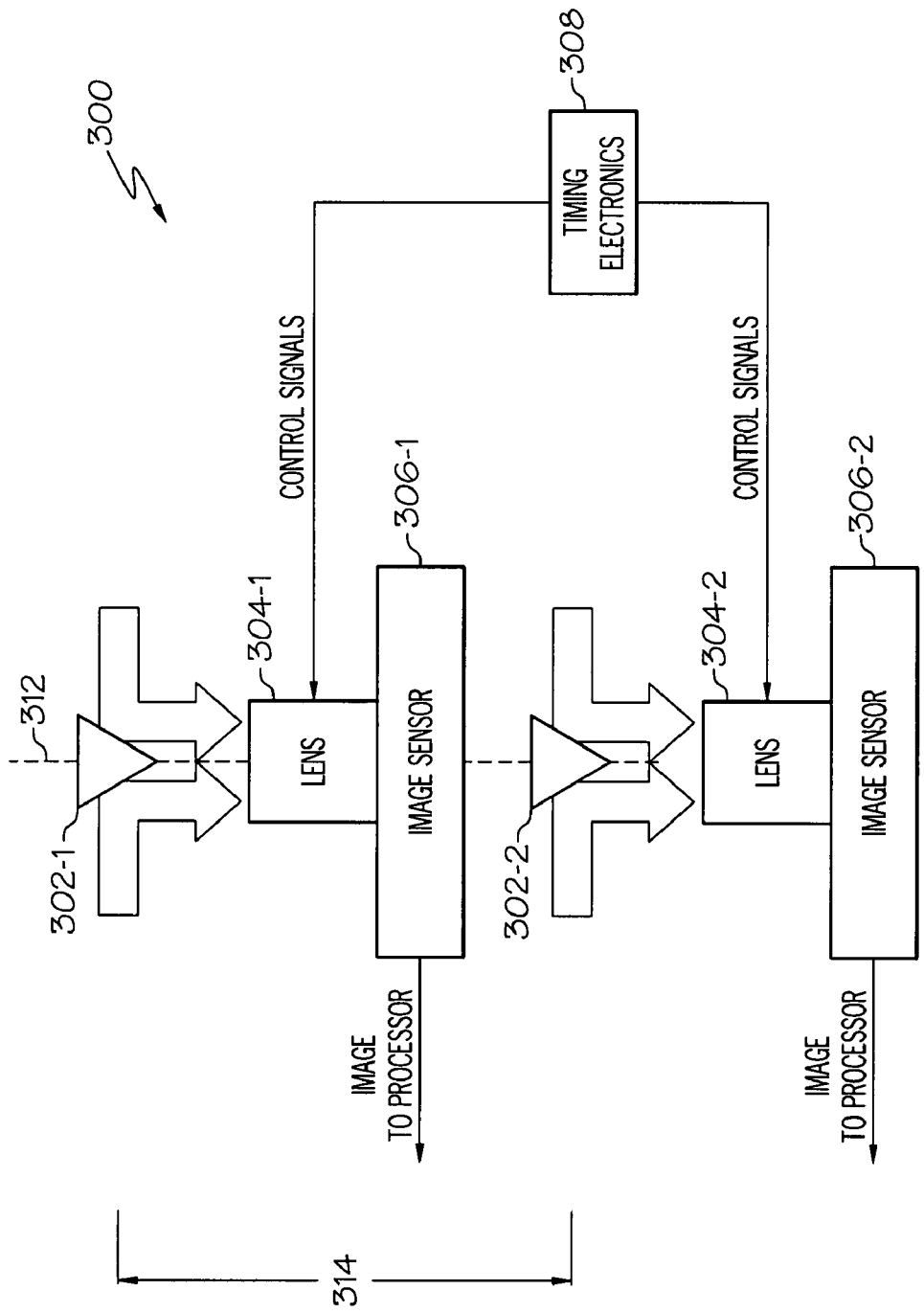
FIG. 3 is a block diagram of a stereo camera according to one embodiment of the present invention.

FIG. 3 is a block diagram of a stereo camera 300 according to one embodiment of the present invention. In this embodiment, stereo camera 300 includes two reflective surfaces 302-1 and 302-2, two lenses 304-1 and 304-2, two image sensors 306-1 and 306-2, and timing electronics 308. Reflective surfaces 302-1 and 302-2 reflect a 360 degree view to lenses 304-1 and 304-2, respectively. Reflective surfaces 302-1 and 302-2 are placed on a common axis (e.g. axis 312) and separated by a known distance (e.g. distance 314). In particular, in this example, reflective surfaces 302-1 and 302-2 are separated vertically and face a common direction. Alternative configurations, however, are also possible. For instance, in one exemplary alternative configuration, reflective surfaces 302-1 and 302-2 are separated vertically and face opposite directions. Separating reflective surfaces 302-1 and 302-2 vertically prevents each surface from showing up in the view reflected by the other surface.

Figure 10:
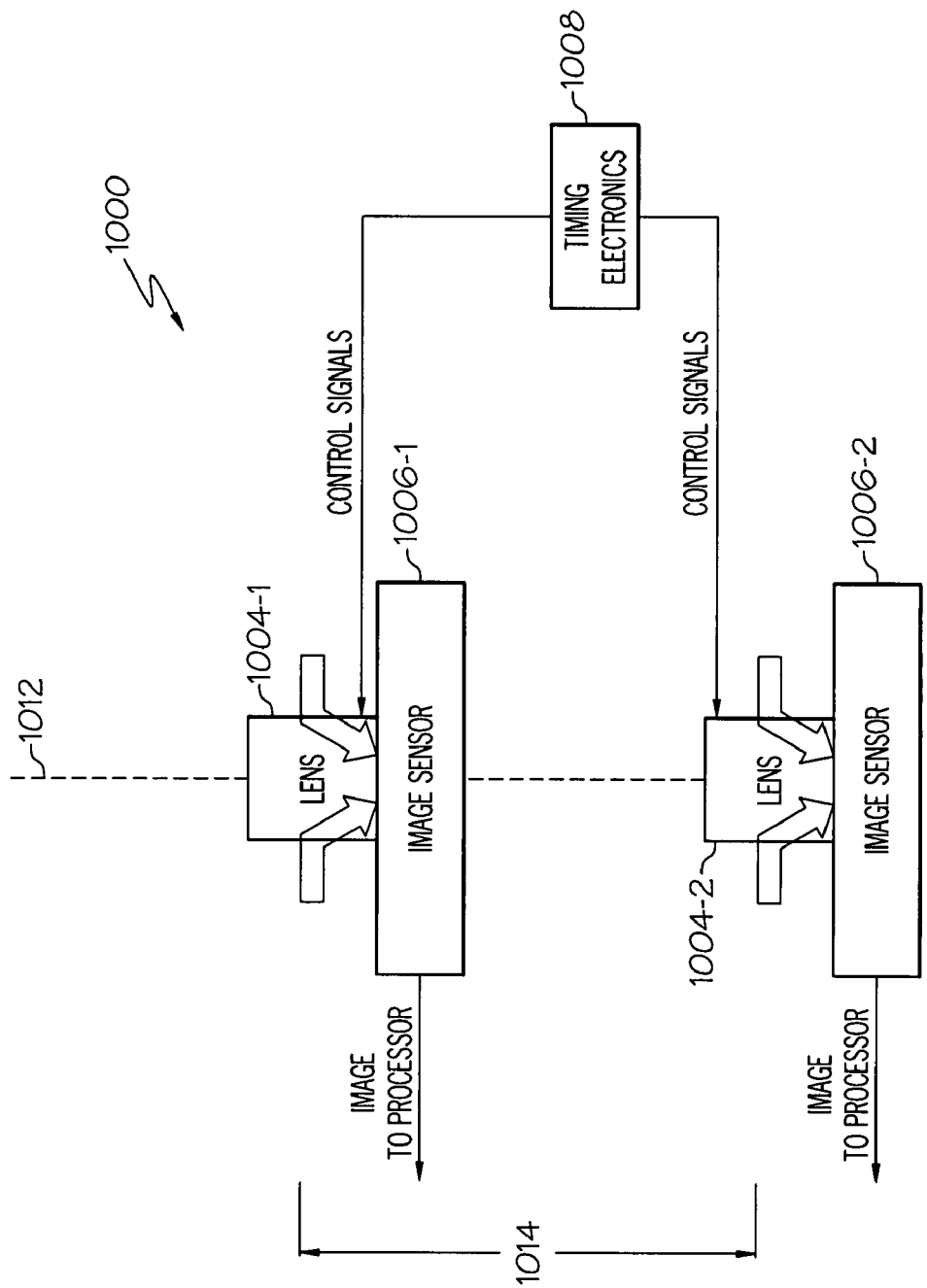
FIG. 10 is a block diagram of another stereo camera according to one embodiment of the present invention In accordance with common practice, the various described features are not drawn to scale but are drawn to emphasize specific features relevant to the present invention.

In another exemplary alternative configuration, shown in FIG. 10, lenses 1004-1 and 1004-2 are ultra-wide angle lenses (e.g. circular fisheye lenses). An ultra-wide angle lens is a lens which takes in an approximately 360 degree horizontal and 180 degree hemispherical view of the area. In such embodiments, reflective surfaces 302-1 and 302-2 are not needed since lens 1004-1 and 1004-2 direct views of the area to image sensors 1006-1 and 1006-2. Other components (e.g. timing electronics 1008 and image sensors 1006-1 and 1006-2) shown in FIG. 10 function as described in relation to the embodiment shown in FIG. 3.

Returning to FIG. 3, the shape of each reflective surface 302-1 and 302-2 is configured to provide a 360 degree horizontal field of view of the area. For example, in this embodiment, each of reflective surfaces 302-1 and 302-2 are shaped as pyramids. However, in other embodiments, other shapes are used. Exemplary shapes of reflective surfaces 302-1 and 302-2 are shown in FIGS. 8A-8E and include, but are not limited to, a cone, hemisphere, geodesic dome, pyramid, and tetrahedron, respectively. Also, reflective surfaces 302-1 and 302-2 are made of any suitable material for providing specular reflection of an image (i.e. single outgoing direction for a single incoming direction) such as a mirror.

Lenses 304-1 and 304-2, in this embodiment, are each focused on the respective reflective surfaces 302-1 and 302-2 such that objects in the reflected views are in focus when arriving at the respective image sensors 306-1 and 306-2. Timing electronics 308 sends control signals to each of lenses 304-1 and 304-2 and image sensors 306-1 and 306-2. The control signals indicate when the shutter of each lens 304 is to open and for how long, thereby, capturing an image of the reflected view. In particular, in this embodiment, timing electronics 308 sends control signals such that image sensors 306-1 and 306-2 each capture an image at approximately the same time. A reflected view, therefore, passes through one of lens 304-1 and 304-2 to the respective image sensor 306-1 and 306-2.

Image sensors 306-1 and 306-2 are implemented using charge-coupled devices (CCD) in this example. However, embodiments of the present invention are not to be so limited. In particular, image sensors 306-1 and 306-2 can be implemented as any appropriate device for converting a visual image into an electrical signal such as Complementary Metal-Oxide-Semiconductor (CMOS) sensors (e.g. active-pixel image sensors). Image sensors 306-1 and 306-2 pass the electrical image data to a processor, such as processor 102, which calculates relative position based on the image data.

Figure 4:
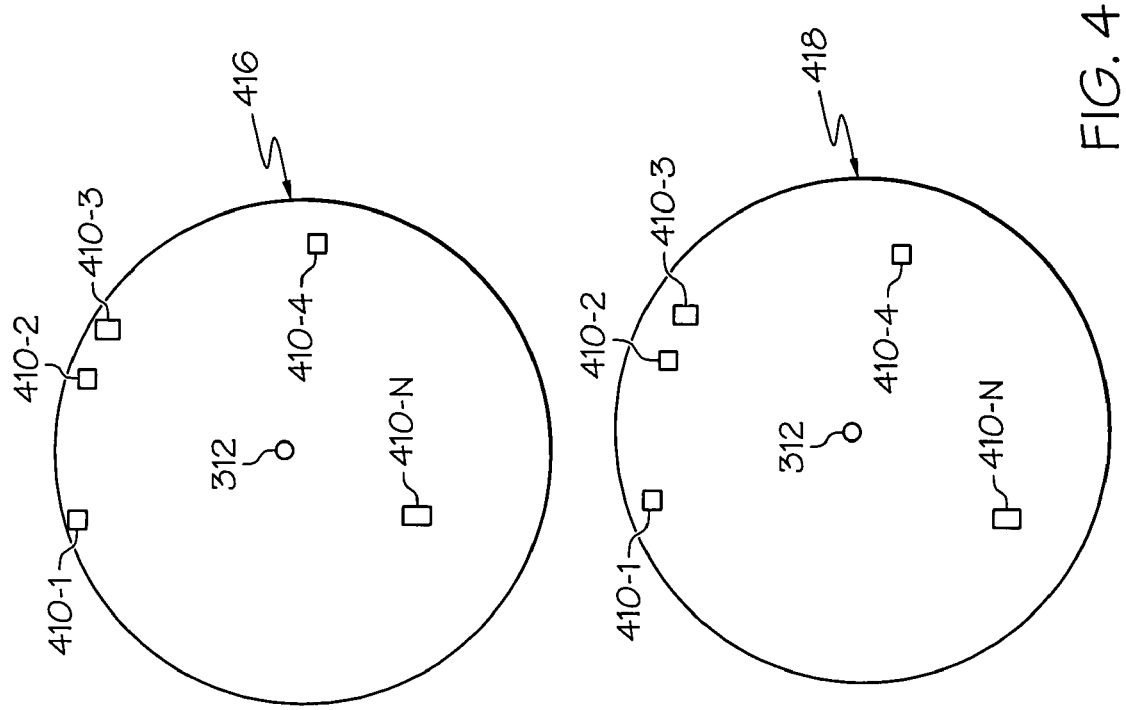
FIG. 4 is an exemplary block diagram representation of images from reflective surfaces.

Due to the common axis and separation, reflective surfaces 302-1 and 302-2 each reflect a view of substantially the same subject area (e.g. area 200) but from different locations. In particular, the view reflected from each of reflective surfaces 302-1 and 302-2 comprises an approximately 360 degree view of the subject area. FIG. 4 shows an exemplary block diagram representation of captured images of reflected views from reflective surfaces 302-1 and 302-2. As can be seen, the relative position of objects 414-1 . . . 414-N is different in each of images 416 and 418 due to the separation of reflective surfaces along axis 312.

Figure 5:
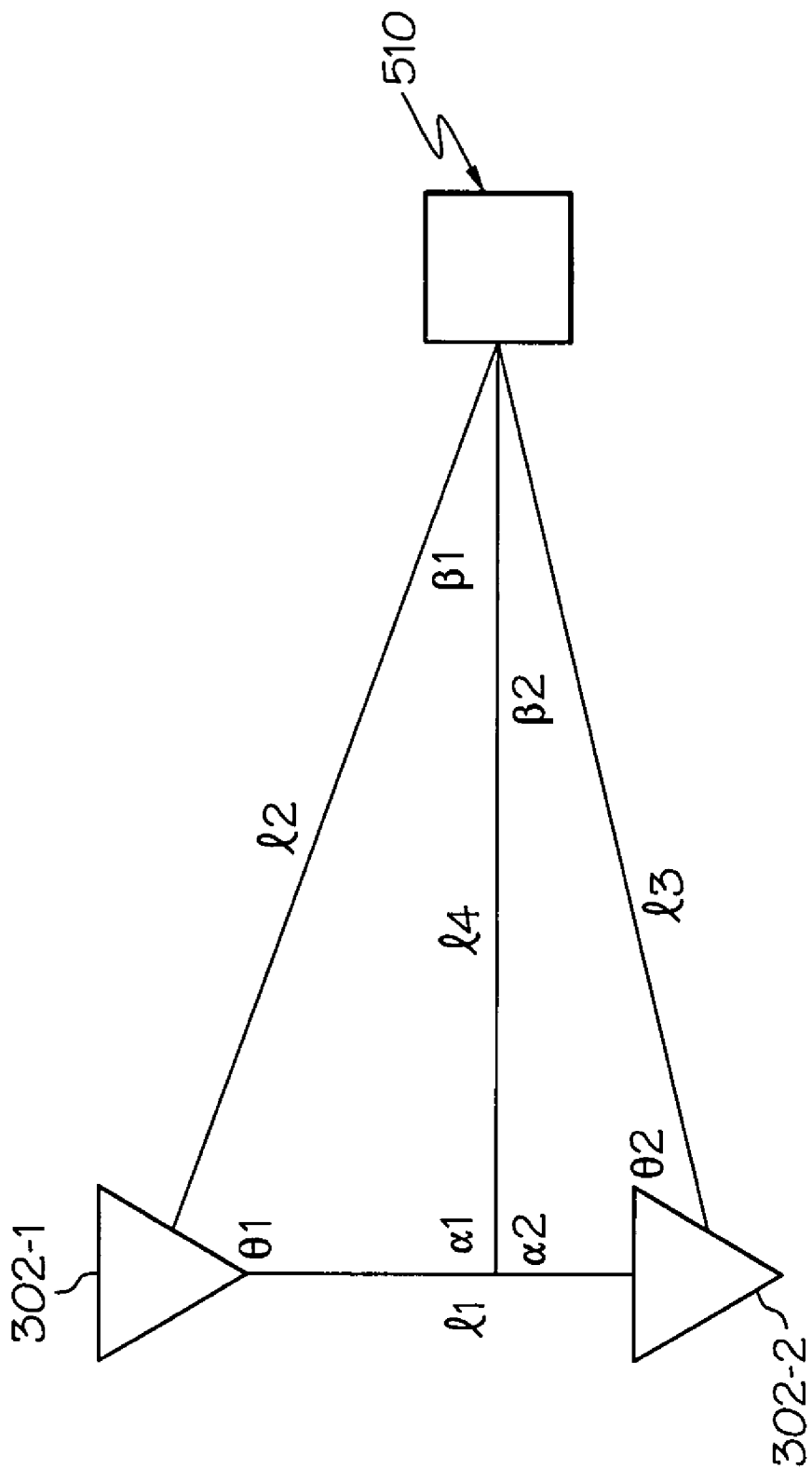
FIG. 5 is a block diagram showing exemplary relative angles and distances from reflective surfaces to an object.

A processor, such as processor 102 in FIG. 1, uses the image data from each of image sensors 306-1 and 306-2 to determine the location of the host vehicle relative to objects in the area. In particular, the processor correlates the position of objects in image data from image sensor 306-1 with the position of the same objects in image data from image sensor 306-2. It is to be understood that one of skill in the art knows how to identify and correlate objects in a camera image. Thus, details of the process of identifying and correlating image objects are not discussed in more detail herein. Based on this correlation, the processor measures relative angles between reflective surfaces 302-1 and 302-2. Using the known separation distance 314 and the measured relative angles, the processor calculates the distance from the host unit to objects in the area. The processor can determine the distance (range) and angular orientation (e.g., relative pitch, roll, and/or yaw) to the object FIG. 5 is a block diagram showing exemplary relative angles and distances from reflective surfaces 302-1 and 302-2 to an object 510 used to compute the range to the object. Length l1 is the known separation distance 314 and angles α1 and α2 are right angles (90 degrees). As discussed above, based on the correlation of images captured by image sensors 306-1 and 306-2, the processor measures angles θ1 and θ2. The processor also calculates angles β1 and β2 since the total of all angles in a triangle equals 180 degrees. Knowing length l1 and all angles, lengths l2, l3, and l4 can be calculated using the laws of sines and cosines. In addition, alternative formulations, used in other embodiments, are known to one of skill in the art that is familiar with vision based navigation systems. Such alternative formulations include, but are not limited to, Kalman Filters which estimate the range and orientation.

Based on the distance to objects, the processor calculates the location of the host unit relative to the objects. By using the relative location of the host unit, the processor is able to interact appropriately with objects in the area. Also, given the absolute location of the objects, the absolute location of the host unit is then determined based on the location of the host unit relative to the objects.

In addition, in some embodiments, the processor correlates the position of objects in image data obtained from each image sensor 306-1 and 306-2 at a first moment in time to the corresponding position of objects in an image obtained from each image sensor 306-1 and 306-2 at a second moment in time. By correlating the position of objects between moments in time as well as between image sensors 306-1 and 306-2, the processor determines the velocity of the host vehicle relative to the correlated objects based on the measured movement of objects in the images. Additionally, when the velocity of the host vehicle is known, the relative velocity of the objects with respect to the host vehicle can be determined based on the measured movement of objects in the images.

The 360 degree horizontal field of view enables improved detection of objects and calculation of distances. In a typical stereo vision system, the horizontal field of view is limited. Therefore, objects outside the horizontal field of view are not detected and, during maneuvers, objects go in and out of the field of view of the camera. For example, an object approaching the host vehicle from or located on the side of the host vehicle is not detected, making it difficult to track the object in a typical stereo camera system. Also, by having a 360 degree horizontal field of view, more objects at a given point in time can be detected and used to determine the position of the host vehicle than in a typical stereo vision system with a limited horizontal field of view. Using more objects increases the number of measurements which in turn increases the accuracy of the calculated location of the host unit.

Figure 6:
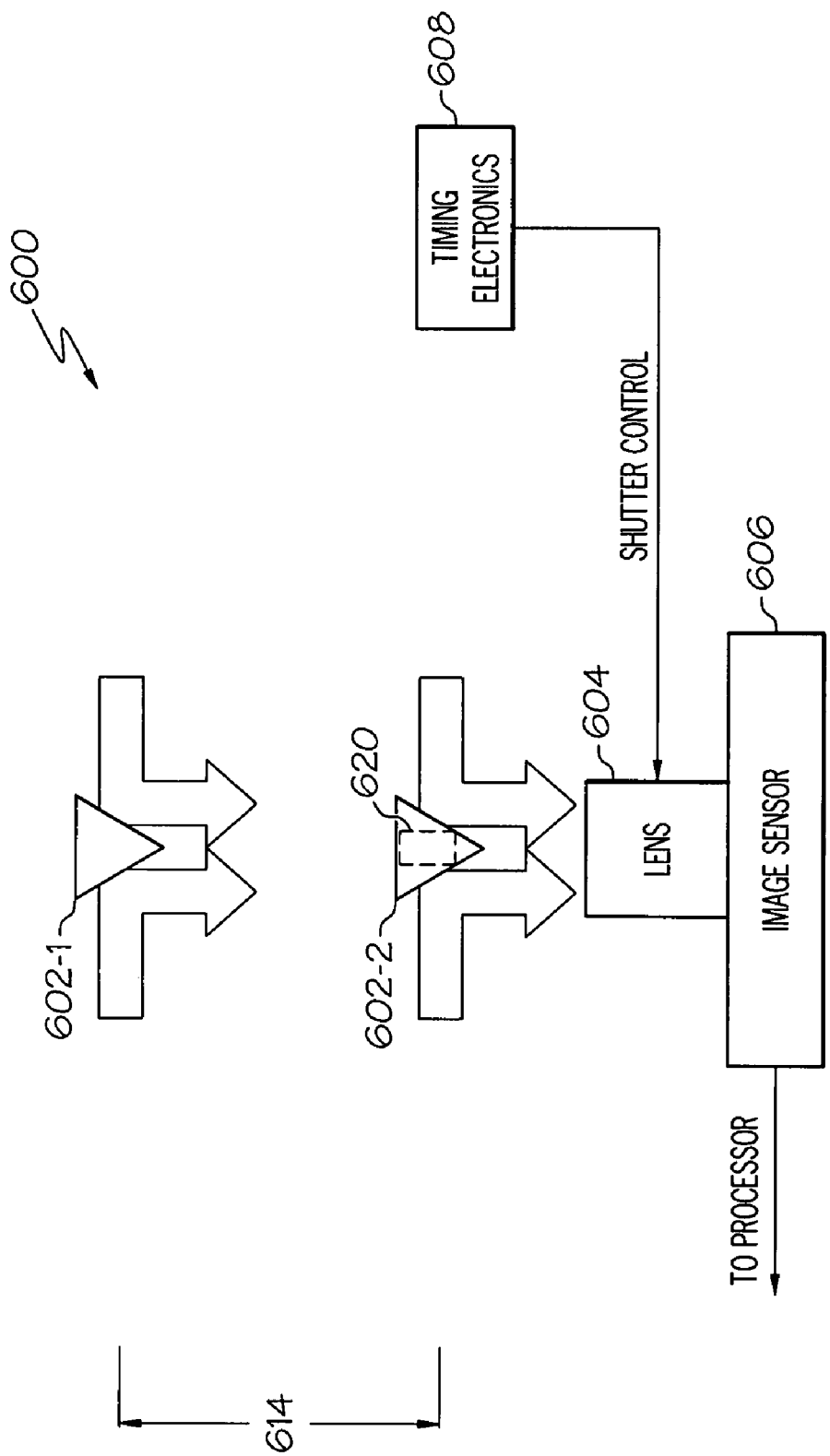
FIG. 6 is a block diagram of another stereo camera according to one embodiment of the present invention.

FIG. 6 is a block diagram of an alternate stereo camera 600 according to another embodiment of the present invention. Stereo camera 600 includes two reflective surfaces 602-1 and 602-2, timing electronics 608, and one image capture device 605. Image capture device 605 comprises lens 604 and image sensor 606. Reflective surfaces 602-1 and 602-2 are placed on a common axis and separated vertically by a known distance 614 as described above in FIG. 3. However, in stereo camera 600, reflective surfaces 602-1 and 602-2 each reflect a 360 degree view of an image to image capture device 605 from positions separated by a distance 314 at the same moment in time. Hence, each image captured by image capture device 605 contains a section corresponding to a view reflected by reflective surface 602-1 and a section corresponding to a view reflected by reflective surface 602-2.

Reflective surfaces 602-1 and 602-2 are made of any suitable material for providing specular reflection of an image such as a mirror. The shape of each reflective surface 602-1 and 602-2 is configured to provide a 360 degree horizontal field of view of the area. For example, in this embodiment, each of reflective surfaces 602-1 and 602-2 are shaped as pyramids. However, in other embodiments, other shapes are used. Exemplary shapes of reflective surfaces 602-1 and 602-2 are shown in FIG. 8 and include, but are not limited to a cone, hemisphere, pyramid, tetrahedron, and geodesic dome.

Figure 7:
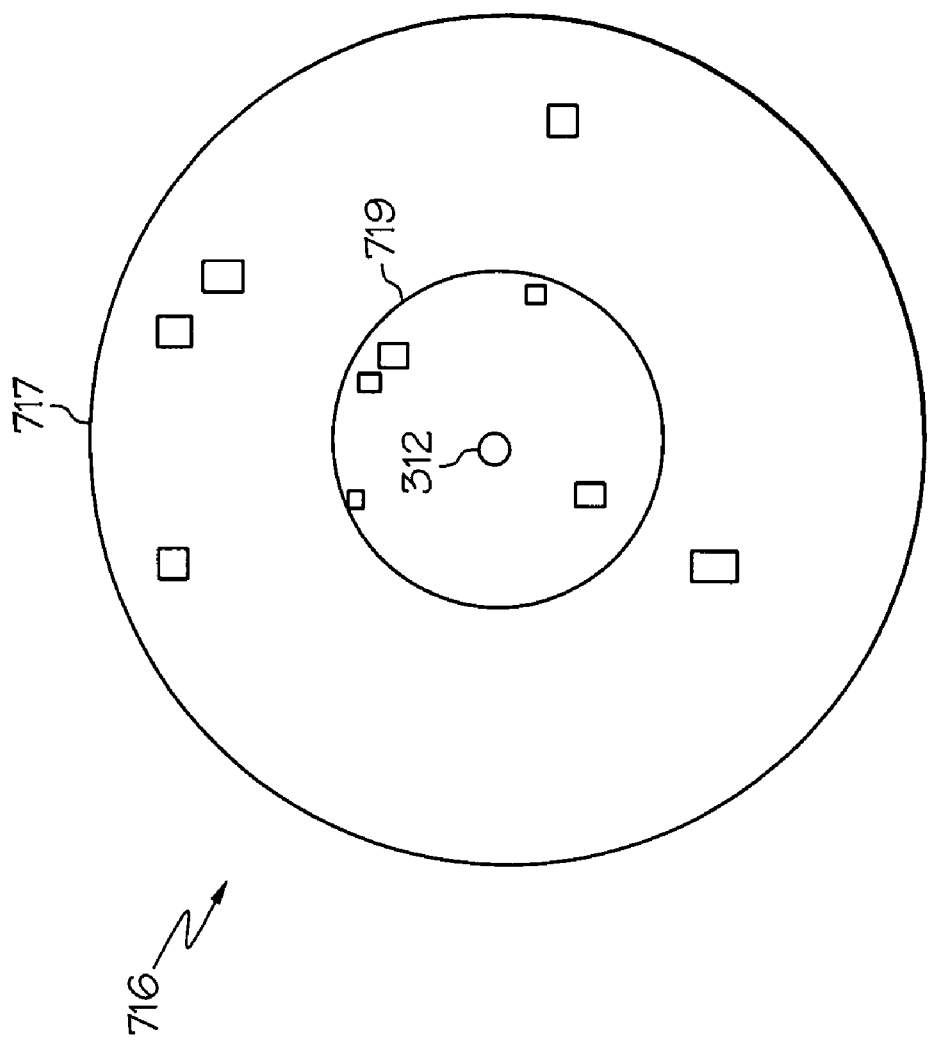
FIG. 7 is another exemplary block diagram representation of images from reflective surfaces.
Figure 8C:
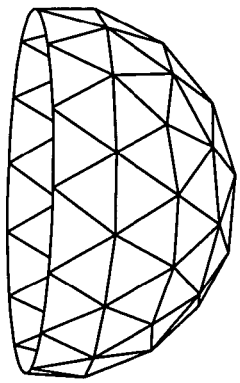
FIG. 8 shows exemplary shapes of reflective surfaces used in embodiments of the present invention.
Figure 8B:
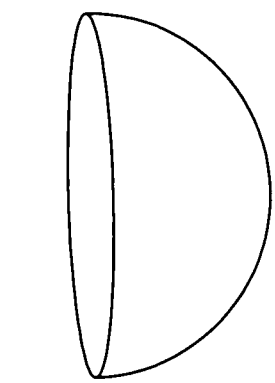
Figure 8A:
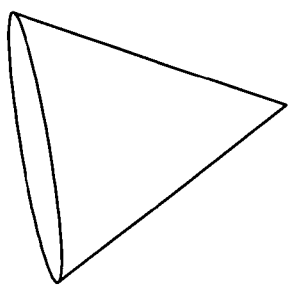
Figure 8E:
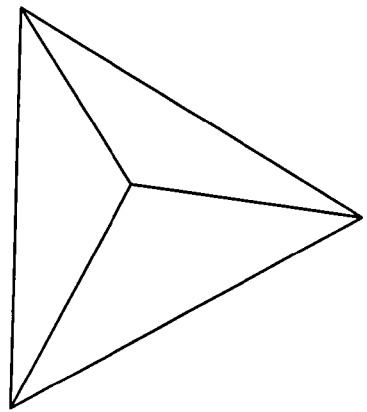
Figure 8D:
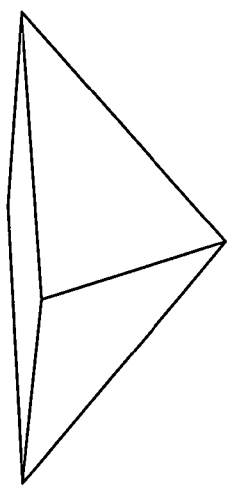

In addition, reflective surface 602-2 is configured with a void 610 which passes through the center of reflective surface 602-2. Reflective surface 602-1 is smaller than reflective surface 602-2 such that a view reflected from reflective surface 602-1 passes through the void 610 and arrives at lens 604. Many configurations of voids exist which would be consistent with the reflective surfaces 602-1, such as a cylindrical tunnel. An exemplary image captured by image sensor 606 is shown in FIG. 7. As can be seen, image 716 comprises two sections 717 and 719. Section 717 corresponds to a view reflected from reflective surface 602-2 and section 719 corresponds to a view reflected from reflective surface 602-1. The void 610 enables image sensor 606 to capture each reflected view in a single image 716. Lens 604 is configured to provide optimal focus for both reflections which will have a nearly common focal length.

Figure 9:
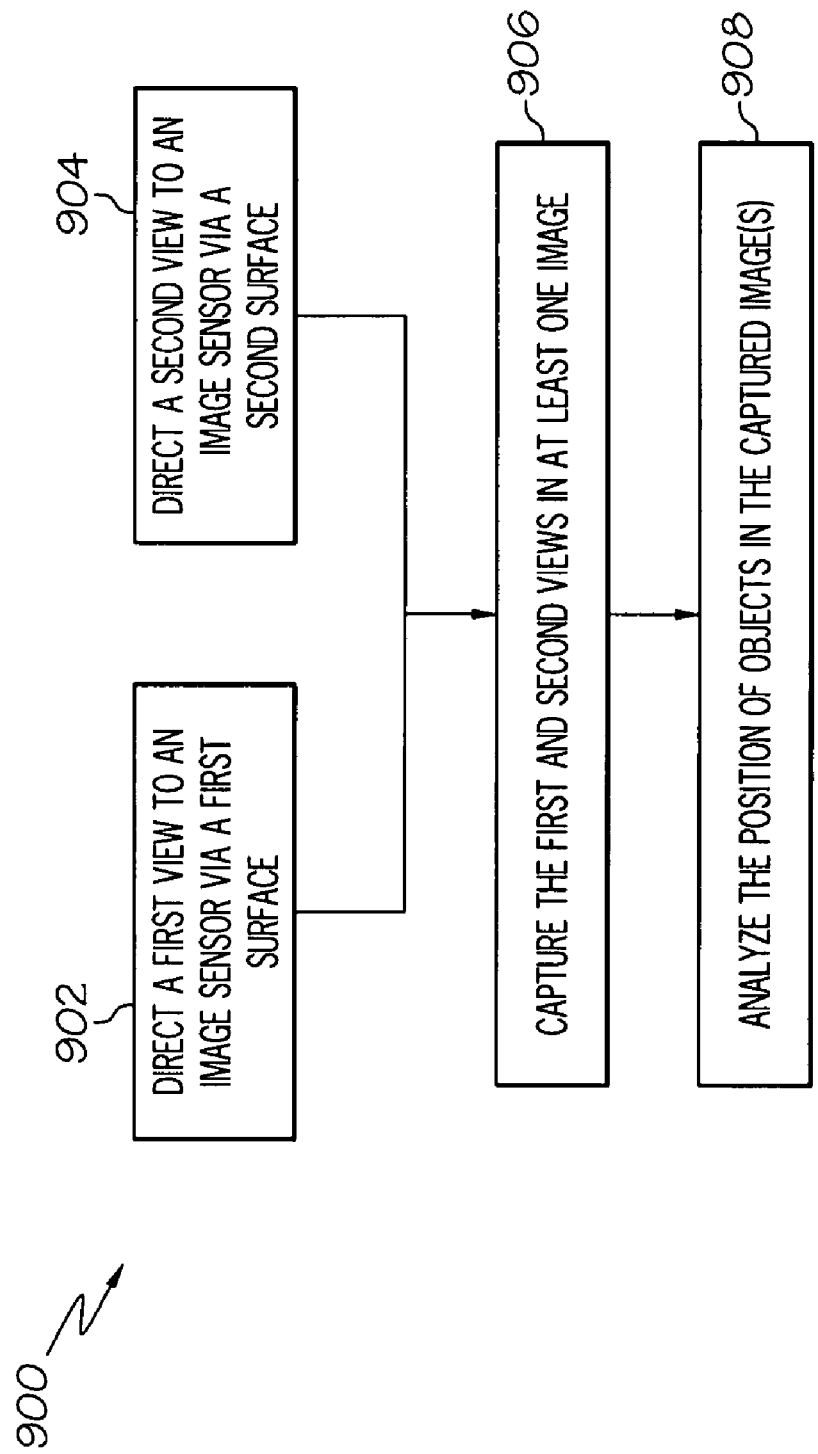
FIG. 9 is a flow chart of a method of determining a relative position of an object with respect to the host unit according to one embodiment of the present invention.

FIG. 9 is a flow chart of a method 900 of determining the relative location of an object with respect to a host unit according to one embodiment of the present invention. At 902, a first view is directed from a first surface, such as reflective surface 302-1, to an image sensor. In one embodiment, the first surface is a reflective surface which reflects the first view to the image sensor. In another embodiment, the first surface is an ultra-wide angle lens (e.g. lens 1004-1, 1004-2) which refracts the first view to the image sensor. The first view comprises an approximately 360 degree horizontal view of an area as described above. At 904, a second view is directed from a second surface, such as reflective surface 302-2, to an image sensor. The second view also comprises an approximately 360 degree view of the area. Similar to the first surface, in one embodiment, the second surface is a reflective surface which reflects the second view to the image sensor. In another embodiment, the second surface is an ultra-wide angle lens which refracts the second view to the image sensor.

At 906, the first and second views are captured with in at least one image with an image sensor, such as image sensor 306. The first and second views are captured at substantially the same moment in time. In particular, in one embodiment, the first and second views are reflected to the same image sensor which captures the two views in a single image. For example, in one such embodiment, the first view is reflected from the first reflective surface through a void, such as 610, in the second reflective surface, as described above. The same image sensor then captures a single image containing both views reflected from the first and second reflective surfaces at the same moment in time as described above. In another embodiment, two separate image sensors are used. In such embodiments, each image sensor captures one of the views as described above.

At 908, the position of objects in the captured image(s) is analyzed to determine the relative position of the objects with respect to the host unit. In some embodiments, where the absolute location of the objects is known, the absolute position of the host unit is also determined. In particular, the known location of the objects (such as a stored location in memory as described above) and the relative position of the objects are analyzed to determine the location of the host unit. Similarly, in some embodiments, where the absolute position of the host unit is known, the location of the objects is also determined based on the relative position of the objects with respect to the host unit and the known location of the host unit.

In one embodiment, analyzing the position of the objects includes correlating the position of objects in a first captured image with the position of the same objects in a second captured image. Relative measurements, such as angles and distances, between the first and second surfaces and the objects are then calculated based on the correlation of object position. The distance and angular orientation from the host unit to the objects is then calculated based on the relative measurements and a known separation distance between the first and second surfaces. The distance and angular orientation from the host unit to the objects are used to determine the relative location of the host unit with respect to the common objects in the image. In addition, the velocity of a host unit relative to the objects based on changes in position of the objects in the at least one image after a period of time is also determined in some embodiments. Similarly, in some embodiments, the relative velocity of the objects with respect to the host unit is also determined, in some embodiments, based on the changes in position of the objects and the known velocity of the host unit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A navigation system comprising:
    a stereo camera configured to capture a first and a second view of an area at a common moment in time, each of the first and second views comprising an approximately 360 degree view of the area; and
    a processor configured to calculate the location of objects which exist in both views;
    wherein the stereo camera comprises:
        a first reflective surface configured to reflect the first view of the area;
        a first image sensor configured to capture the first reflected view in a first image;
        a second reflective surface configured to reflect the second view of the area: and
        a second image sensor configured to capture the second reflected view in a second image;
    wherein the processor is configured to calculate the location of objects which exist in both views by:
        correlating the position of the objects in the first image with the position of the objects in the second image;
        determining one or more relative measurements between the objects and the first and second surfaces based on the correlation of the position of the objects in the first and second images; and
        calculating the distance from the navigation system to the objects based on the relative measurements;
    wherein the processor is further configured to determine one of the velocity of the navigation system relative to the objects or the velocity of objects relative to the navigation system based on changes in position of the objects in the first and second images after a period of time.

2. The navigation system of claim 1, wherein the processor is further configured to calculate the range and angular orientation to the objects along the horizon which exist in both views.

3. The navigation system of claim 1, further comprising at least one of: a global positioning satellite (GPS) sensor configured to provide position data to the processor, a heading sensor configured to provide heading data to the processor, a speed sensor configured to provide speed data to the processor, an altimeter sensor configured to provide altitude data to the processor, and an inertial measurement unit (IMU) configured to provide location data to the processor.

4. The navigation system of claim 1, further comprising a memory configured to store the location of mapped objects.

5. The navigation system of claim 1, wherein the first and second reflective surfaces are separated along a common axis.

6. A stereo camera comprising:
    a first image sensor;
    a second image sensor;
    a first surface configured to direct a first view of an area to the first image sensor configured to capture the first view in a first image, the first view comprising an approximately 360 degree view of the area; and
    a second surface configured to direct a second view of the area to the second image sensor configured to capture the second view in a second image, the second view comprising an approximately 360 degree view of the area
    wherein each of the first and second surfaces comprise one of a reflective surface and a refractive lens;
    wherein each of the first image sensor and the second image sensor are configured to pass the first image and the second image, respectively, to a processor configured to:
        correlate the position of at least one object in the first image with the position of the at least one object in the second image;
        determine one or more relative measurements between the objects and the first and second surfaces based on the correlation of the position of the objects in the first and second images;
        calculate a distance to the at least one object based on relative measurements between the at least one object and the first and second surfaces; and
        determine one of the velocity of a navigation system relative to the objects or the velocity of objects relative to the navigation system based on changes in position of the objects in the first and second images after a period of time.

7. The stereo camera of claim 6, wherein the at least one image sensor comprises one of a charge-coupled device (CCD) and a complementary metal-oxide-semiconductor (CMOS) sensor.

8. The stereo camera of claim 6, wherein the first and second surfaces are separated along a common axis.

9. A method of determining a relative location of at least one object in an area with respect to a host unit, the method comprising:
    directing a first view of the area to a first image sensor via one of a first reflective surface or a first ultra-wide angle lens, wherein the first view comprises an approximately 360 degree view of the area;
    directing a second view of the area to a second image sensor via one of a second reflective surface or a second ultra-wide angle lens, wherein the second view comprises an approximately 360 degree view of the area;

capturing, with the first image sensor, the first view in a first image;

capturing the second view in a second image with the second image sensor; and analyzing the position of the at least one object identified in both the first and second views to determine the relative location of the at least one object with respect to the host unit wherein analyzing the position of the at least one object comprises:
    correlating the position of the at least one object in the first image with the position of the at least one object in the second image;
    determining one or more relative measurements between the at least one object and the first and second surfaces based on the correlation of the position of the at least one object in the first and second images; and
    calculating the distance from the host unit to the at least one object based on the relative measurements;

wherein analyzing the position of the at least one object further comprises one of:
    determining the velocity of the host unit relative to the at least one object based on changes in position of the at least one object in the first and second images after a period of time; and
    determining the velocity of the at least one object relative to the host unit based on changes in position of the at least one object in the first and second images after a period of time.

10. The method of claim 9, wherein analyzing the position of the at least one object further comprises at least one of:
    determining the location of the host unit based on a known location of the at least one object and the relative location of the at least one object with respect to the host unit; and
    determining the location of the at least one object based on a known location of the host unit and the relative location of the at least one object with respect to the host unit.

* * * * *